US006195042B1

United States Patent
Durnez et al.

(10) Patent No.: US 6,195,042 B1
(45) Date of Patent: Feb. 27, 2001

(54) METHOD OF LOCATING A FIXED TERMINAL USING A CONSTELLATION OF SATELLITES

(75) Inventors: François Durnez, Paris; Jacques Bousquet, Croissy sur Seine, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/138,658

(22) Filed: Aug. 24, 1998

(30) Foreign Application Priority Data

Aug. 25, 1997 (FR) .................................................. 97 10602

(51) Int. Cl.⁷ ............................. G01B 5/02; H04B 7/185; H04Q 7/20
(52) U.S. Cl. ........................................ 342/357.16; 455/456
(58) Field of Search .............................. 342/357.01, 450, 342/457, 357.16; 455/456, 12.1

(56) References Cited

FOREIGN PATENT DOCUMENTS

| 1 591 518 | 7/1967 | (DE) . |
| WO 92/21181 | 11/1992 | (WO) . |

OTHER PUBLICATIONS

American Heritage Dictionary of the English Language, Third Edition, hyperboloid, 1992.*

* cited by examiner

Primary Examiner—Thomas H. Tarcza
Assistant Examiner—Fred H. Mull
(74) Attorney, Agent, or Firm—Sughrue, Mion, Zinn, Macpeak & Seas, PLLC

(57) ABSTRACT

A method of locating a fixed terminal of a telecommunication system comprising a constellation of satellites, a plurality of gateway stations and a plurality of fixed terminals includes "coarse", "intermediate" and "fine" location phases.

During the "intermediate" location phase, the terminal calculates at least three hyperboloids and their intersection, assuming a "coarse" estimated position of the terminal is known. Each hyperboloid can be written:

$$H_{i,j}: dj - di = (tj' - tj).c - (ti' - ti).c$$

where:

- $di$ is the distance between the terminal and the position $pi$ of the ith active satellite at time $ti$,
- $dj$ is the distance between the terminal and the position $pj$ of the jth active satellite at time $tj$,
- $ti$ and $tj$ are the ith and jth times of transmission by the ith and jth satellites, respectively, of ith and jth information relating to $ti$ and $di$ and to $tj$ and $dj$, respectively,
- $ti'$ and $tj'$ are the ith and jth times of reception by the terminal of the ith and jth information, and
- $c$ is the speed of light.

15 Claims, 5 Drawing Sheets

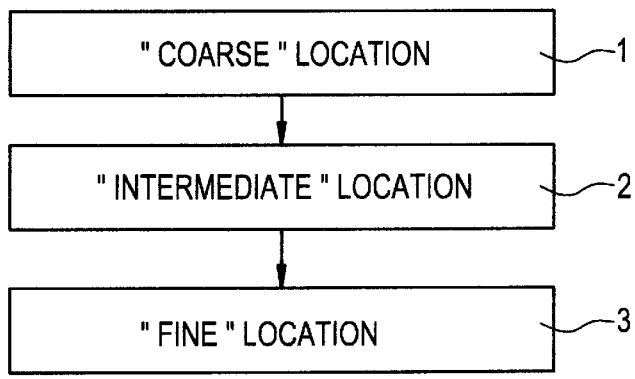
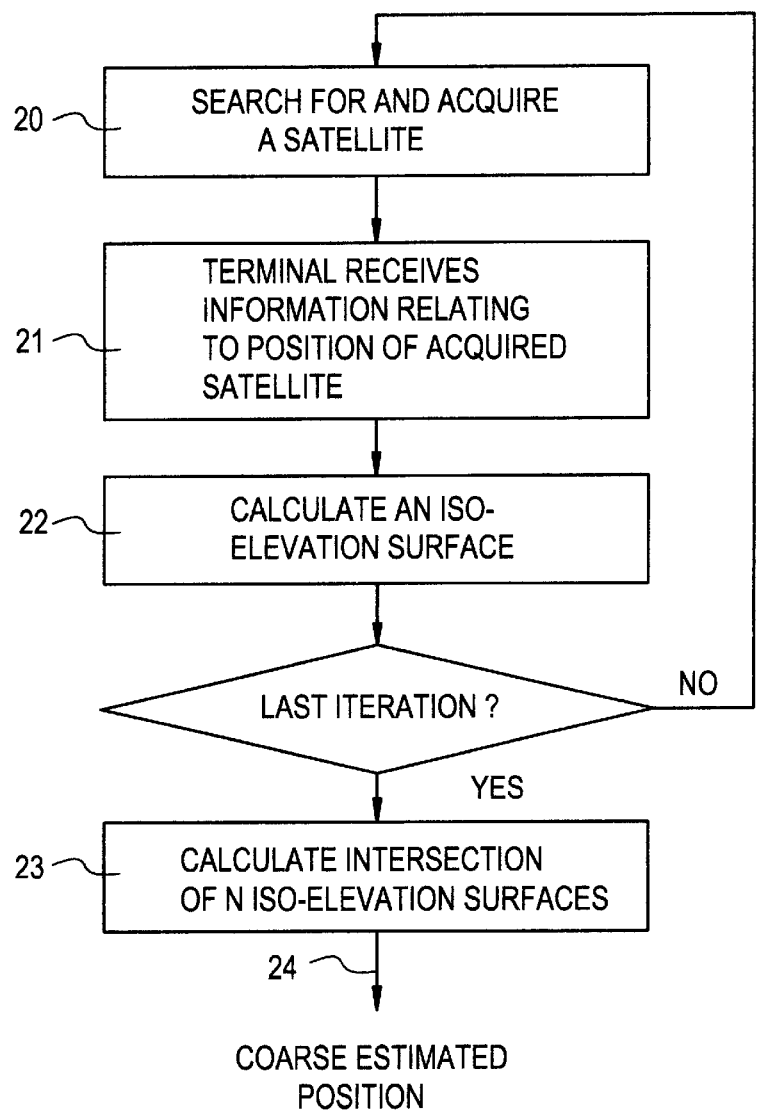

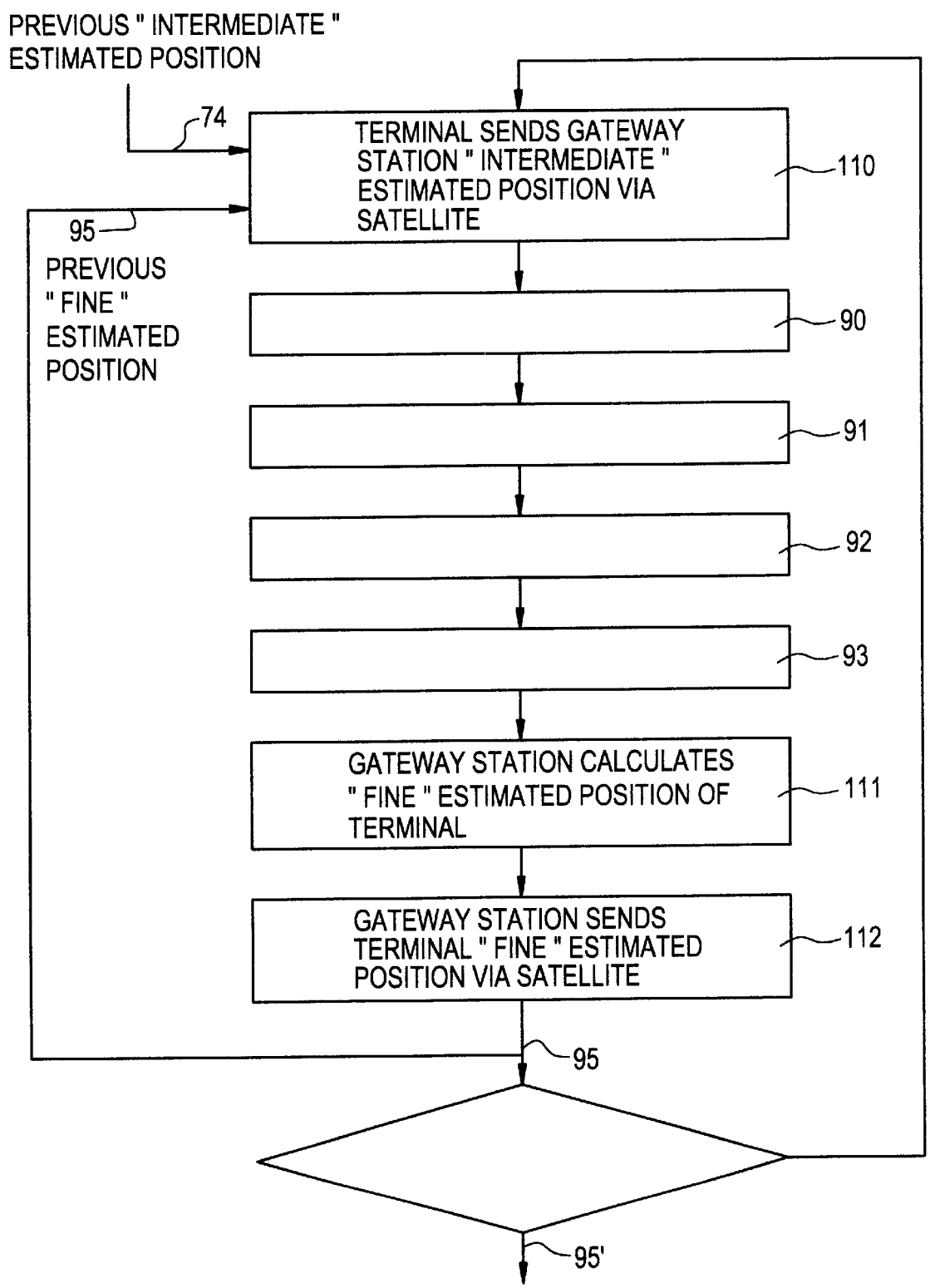

METHOD OF LOCATING A FIXED TERMINAL USING A CONSTELLATION OF SATELLITES

BACKGROUND OF THE INVENTION

1. Field of the Invention

The field of the invention is that of satellite telecommunication systems.

2. Description of the Prior Art

A conventional satellite telecommunication system includes a constellation of non-geostationary satellites (for example 64 satellites in low Earth orbit), a plurality of gateway stations and a plurality of fixed terminals. Each gateway station is associated with a separate geographical cell ("spot") and is connected to a terrestrial telecommunication network. Each terminal communicates via the satellites with the gateway station of the cell in which it is located (and consequently with the terrestrial telecommunication network). When it is active in relation to a gateway station, each satellite receives information from the gateway station that it transmits to the fixed terminal or terminals in its coverage area. When it is active in relation to a gateway station, each satellite transmits to the gateway station information that it receives from each fixed terminal in its coverage area. A satellite can be active in relation to a gateway station only if it is visible from the gateway station.

To be more precise, the invention concerns a method of locating a fixed terminal of a satellite telecommunication system of the above kind.

It is necessary to know the position of each fixed terminal of the system for various reasons. For example, this enables synchronization of the fixed terminals to prevent or to reduce mutual interference between signals transmitted by different fixed terminals when received by the satellites. It also enables the charging area to which each fixed terminal belongs to be determined.

Note that the terminal referred to here is a fixed terminal. It is therefore located when initially installed or each time it is installed again if the terminal is moved (for example from one house to another).

A first prior art solution to the problem of locating a fixed terminal consists in providing in the fixed terminal a receiver of one of the existing location systems such as the Global Positioning System (GPS) or the Global Navigation Satellite System (GLONASS).

This first prior art solution has the major disadvantage of being very costly. A GPS or GLONASS receiver is too costly compared to a "consumer" fixed terminal. Also, because the fixed terminal is located only when it is installed, adding a dedicated location receiver to the fixed terminal represents an investment out of all proportion to the use that is made of it.

A second prior art solution is to employ the existing infrastructure (in particular the fixed terminal to be located and certain satellites of the constellation) and an Angle Of Arrival (AOA) or Time Difference Of Arrival (TDOA) location technique known in itself.

Using the AOA technique the position of the terminal is determined by combining angles of arrival of signals from different satellites. Using the TDOA technique the position of the terminal is determined by combining time differences of arrival of signals from different satellites.

Unlike the first prior art solution discussed above, this second prior art solution does not necessitate any dedicated location receiver (of the GPS or GLONASS type).

Nevertheless, whichever location technique is used (AOA or TDOA), this second prior art solution is difficult to put into practice. The AOA technique necessitates precise referencing of antennas in azimuth and in elevation and the TDOA technique necessitates synchronized satellite transmitters. These various conditions are difficult, if not impossible, to comply with without significantly increasing the cost of the system. Once again it should be noted that because it is effected only on installation, the location of the fixed terminal must not represent an excessive investment.

An objective of the invention is to overcome the drawbacks of the prior art.

To be more precise, one objective of the present invention is to provide a method of locating a fixed terminal of a satellite telecommunication system that is simple to put into practice and low in cost.

Another objective of the invention is to provide a method of the above kind that does not require a dedicated GPS or GLONASS location receiver in the fixed terminal.

Another objective of the invention is to provide a method of the above kind employing the existing infrastructure of the system without imposing draconian conditions on the fixed terminal (no precise azimuth reference) or on the satellites (which do not need to be synchronized).

SUMMARY OF THE INVENTION

The above objectives and others that will become apparent hereinafter are achieved in accordance with the invention by means of a method of locating a fixed terminal of a satellite telecommunication system comprising a constellation of satellites, a plurality of gateway stations each associated with a separate geographical cell and connected to a terrestrial telecommunication network, and a plurality of fixed terminals, one or more satellites being active relative to a given gateway station only if they are visible therefrom, each active satellite which receives information from the gateway station relative to which it is active transmits it to the fixed terminal or terminals in its coverage area, each active satellite that receives information from a fixed terminal in its coverage area transmitting the information to the gateway station relative to which it is active, the method including an "intermediate" location phase comprising the following steps:

-i- at a first time t1', the terminal receives from a first active satellite first information relating to the time t1 of transmission of the first information by the first active satellite and the position p1 of the first active satellite at the time t1;

-ii- at a second time t2' the same as or close to the first time t1', the terminal receives from a second active satellite second information relating to the time t2 of transmission of the second information by the second active satellite and the position p2 of the second active satellite at the time t2;

-iii- the terminal calculates a first hyperboloid $H_{1,2}$ on which the terminal is located and such that:

$$H_{1,2}: d2-d1=(t2'-t2).c-(t1'-t1).c$$

where:
    d1 is the distance between the terminal and the position p1 of the first active satellite at time t1,
    d2 is the distance between the terminal and the position p2 of the second active satellite at time t2,
    t1 and t2 are the first and second times of transmission by the first and second satellites, respectively, t1' and t2' are the first and second times of reception by the terminal, and c is the speed of light;

-iv- the terminal reiterates steps -i- through -iii- at least twice to calculate at least second and third hyperboloids on which the terminal is located; and -v- the terminal determines an "intermediate" estimated position by calculating the intersection of the first and at least second and third hyperboloids assuming a "coarse" estimated position of the terminal to be known.

The location method of the present invention therefore includes an "intermediate" location phase, accurate to within ±300 m, for example. The general principle of this "intermediate" location phase consists in having the terminal calculate the intersection of at least three hyperboloids on which it is located, assuming that a "coarse" estimate of its position is already known (for example one accurate to within ±100 km).

Clearly the uncertainty with which this intersection is determined decreases as the number of hyperboloids increases (up to 100 hyperboloids can be used, for example).

It is important to note that the method of the invention is clearly distinguished from the conventional TDOA technique because, in the case of the invention, the terminal calculates each hyperboloid using information received from two satellites that are not necessarily synchronized. The times t1 and t2 of transmission by the first and second satellites, respectively, are not necessarily the same.

This distinctive feature can also be expressed in the following terms: each hyperboloid of the invention does not correspond to a real image of the system because it is not calculated according to the position at a given single time of the first and second satellites. Each hyperboloid of the invention corresponds to an "imaginary" image of the system based on the position p1 of the first satellite at a first given time t1 and the position p2 of the second satellite at a second given time t2.

The only condition imposed by the invention is that the times t1' and t2' of reception by the terminal are the same or closely spaced (for example only a few milliseconds apart) so that the estimate of (t2'−t1') is correct despite the fact that the clock of the terminal is not very accurate compared to that of each of the satellites.

Advantageously, in the step -iv-, each new iteration of steps -i- through -iii- is effected with a pair of satellites belonging to the group comprising:

a pair of satellites separate from the first and second satellites; and a pair of satellites one of which is one of the first and second satellites and the other of which is separate from the first and second satellites.

In other words, the number of satellites needed differs according to the number of satellites that the terminal is capable of receiving from simultaneously. For example, if the terminal is capable of receiving from three satellites simultaneously, it can receive information from the three satellites at identical or close times t1', t2' and t3' and calculate the following three hyperboloids: $H_{1,2}$, $H_{1,3}$ and $H_{2,3}$, where the hyperboloid $H_{i,j}$ is calculated using the ith and jth satellites. On the other hand, if the terminal is capable of receiving simultaneously from only two satellites, then calculating the following three hyperboloids: $H_{1,2}$, $H_{3,4}$ and $H_{5,6}$ requires six different satellites.

Advantageously, the "intermediate" location phase 2 further includes the following step:

-vi- using the previous "intermediate" estimated position instead of the "coarse" estimated position, the terminal reiterates at least once steps -i- through -V- to obtain a new "intermediate" estimated position.

This further improves the "intermediate" location estimate.

Advantageously, the gateway station relative to which the first and second satellites are active transmits the first and second information with temporal precompensation such that after transmission by the first and second satellites the first and second information is received substantially simultaneously by the gateway station.

Preferably, the pair comprising the first and second active satellites belongs to the group comprising:

the pairs in which the two satellites are simultaneously active at any time;

the pairs in which the two satellites, respectively outgoing and incoming, are simultaneously active exclusively during hand-off between satellites, enabling a gateway station to replace the outgoing active satellite, which is ceasing to be visible, by the incoming active satellite, which is becoming visible.

Note that from approximately 90% of places on the surface of the Earth it is possible to see at least two active satellites at any time. Approximately 90% of the geographical cells (spots) are covered by at least two satellites simultaneously. Consequently, in 90% of cases it is easy to find two simultaneously active satellites at any time.

For the remaining 10% of points on the surface of the Earth, because a "coarse" estimated position is assumed to be known beforehand, the terminal can point approximately (but adequately) to any satellite entering the spot. By tracking this satellite, the terminal is advised of any hand-off between satellites. Accordingly, during hand-off between satellites, which generally takes a few seconds, the terminal has access to two satellites active simultaneously (one incoming and the other outgoing).

Advantageously, each terminal has means for simultaneously receiving information transmitted by at least two different satellites.

Advantageously, the means for simultaneously receiving information transmitted by at least two separate satellites comprise at least two directional antennas each pointed at a separate satellite.

In one preferred embodiment of the invention, the "intermediate" location phase is preceded by a "coarse" location phase comprising the following steps:

-a- the terminal searches for and acquires a satellite for a predetermined elevation angle α by varying its azimuth angle θ;

-b- the terminal receives from the acquired satellite information relating to the position of the acquired satellite;

-c- the terminal calculates from the information relating to the position of the acquired satellite an iso-elevation surface projected onto a predetermined Earth model and on which the terminal is located;

-d- the terminal reiterates steps -a- through -c- at least twice so as to calculate at least two other iso-elevation surfaces on which the terminal is located; and -e- the terminal determines a "coarse" estimated position by calculating the intersection of the at least three iso-elevation surfaces.

The location method of the present invention therefore also includes a "gross" location phase, accurate to within ±100 km, for example. For the terminal, the general principle of this "coarse" location phase is to calculate the intersection of at least three iso-elevation surfaces on which it is located.

Note that step -b- assumes that the ephemeris of each satellite of the constellation is known to the system. Also, step -c- assumes that the terminal knows the elevation angle α of its antenna relative to the ground. This can be achieved by disposing the terminal horizontally.

Advantageously, of the at least three satellites acquired during successive iteration of steps -a- through -c- at least one has an azimuth angle θ as seen from the terminal separated by at least 10° from the azimuth angles of the other two satellites.

This reduces the area of intersection of the iso-elevation surfaces.

Advantageously, in the step -a-, the two directional antennas turn with the same elevation angle, each covering approximately 180° about the azimuth angle θ

In this way each antenna covers one half-turn in a manner that is complementary with the other antenna and this minimizes the time needed for scanning over a complete turn (i.e. for the azimuth angle θ varying from 0 through 2π).

In one advantageous embodiment of the invention, the "intermediate" location phase is followed by a "fine" location phase comprising the following steps:

-1- the gateway station associated with the cell in which the terminal is located sends the terminal a predetermined message via a satellite active relative to the gateway station;

-2- the terminal receives the predetermined message and, knowing its "intermediate" estimated position and the real time position of the satellites of the constellation, generates and then transmits to the gateway station via the active satellite a response message indicating in particular the time period between reception of the predetermined message and transmission of the response message;

-3- from the response message, the gateway station calculates information relating to the timing advance of the terminal;

-4- the gateway station transmits to the terminal via the active satellite the information relating to the timing advance; and -5- from the information relating to the timing advance and from the "intermediate" estimated position the terminal calculates its "fine" estimated position.

The location method of the present invention therefore includes a "fine" location phase, for example one accurate to within ±60 m. The general principle of this "fine" location phase is to calculate the timing advance of the terminal relative to the gateway station, or to be more precise the timing advance of the signals from the terminal (via the active satellite) when they are received by the gateway station.

Accordingly, unlike the "coarse" and "intermediate" location phases, the "fine" location phase is active, not passive. In other words, the terminal communicates with the gateway station of the cell in which it is located via an active satellite. This communication is effected at particular times, for example, reserved during periods of low traffic and enabling reception of shifted signals.

In an advantageous variant, the "fine" location step further includes the following preliminary and final steps:

-0- the terminal transmits information relating to the "intermediate" estimated position to the gateway station via the active satellite; and -6- the gateway station transmits the "fine" estimated position of the terminal to the terminal via the active satellite;

and the step -5- is replaced by the following step:

-5- from the information relating to the timing advance and the "intermediate" estimated position, the gateway station calculates the "fine" estimated position of the terminal.

In this variant, it is the gateway station (not the terminal) which calculates the "fine" estimated position.

Preferably, the "fine" location phase further includes the following step:

-7- using the previous "fine" estimated position in place of the "intermediate" estimated position, the terminal reiterates at least once steps -1- through -5- or -0- through -6- to obtain a new "fine" estimated position.

Note that if steps -1 through -5- (or -0- through -6-) are reiterated several times using the same previous "fine" estimated position, it is necessary to provide an additional step for determining the optimal new "fine" estimated position for a predetermined set of possible positions. This predetermined set includes, for example, all points within a disk centered on the previous "fine" estimated position and having a radius equal to the uncertainty in the estimate of the previous "fine" estimated position.

Advantageously, in step 7, each new iteration of steps -1- through -5- or -0- through -6- is effected with the same satellite but with azimuth angles θ and/or elevation angles α as seen from the terminal separated by at least 10°.

This attempts to eliminate the bias in satellite location. For example, for satellites in Low Earth Orbit (LEO), complying with the aforementioned conditions leads to waiting five minutes between measurements with the same satellite.

In an advantageous variant, each new iteration of steps -1- through -5- or -0- through -6- in step -7- is effected with a different satellite.

Other features and advantages of the invention will become apparent from a reading of the following description of a preferred embodiment of the invention given by way of illustrative and non-limiting example and from the accompanying drawings.

BRIEF DESCRIPTION OF THE DRAWINGS

FIG. 1 is a simplified flowchart of one particular embodiment of the location method of the invention.

FIG. 2 is a simplified flowchart of one particular embodiment of the "coarse" location phase shown in the FIG. 1 flowchart.

FIG. 11 is a simplified flowchart of a second particular embodiment of the "fine" location phase shown in the FIG. 1 flowchart.

DETAILED DESCRIPTION OF THE PREFERRED EMBODIMENTS

Figure 3:
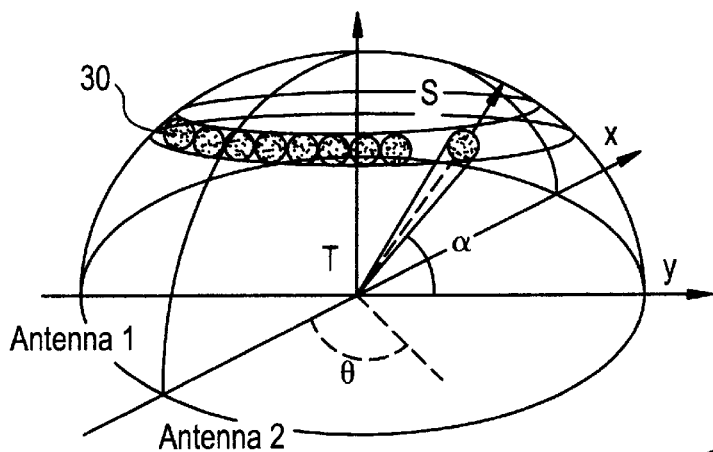
FIGS. 3 and 4 are respectively a perspective view and a plan view of a satellite search ring at a given elevation used to explain one of the steps of the FIG. 2 flowchart.

The invention concerns a method of locating a fixed terminal of a satellite telecommunication system.

In the conventional way, and as already explained in more detail hereinabove, a satellite telecommunication system includes a constellation of satellites, a plurality of gateway stations and a plurality of fixed terminals.

In the particular embodiment of FIG. 1, the location method of the invention comprises:
- a "coarse" location phase 1, for example accurate to within ±100 km;
- an "intermediate" location phase 2, for example accurate to within ±350 m; and
- a "fine" location phase 3, for example accurate to within ±60 m.

Assume, by way of example, that each terminal has two directional antennas enabling simultaneous reception of information transmitted by two different satellites. It is nevertheless clear that each terminal can comprise means for receiving simultaneously from more than two satellites.

One particular embodiment of the "coarse" location phase 1 will now be described with reference to FIGS. 2 through 6.

As shown in the simplified flowchart of FIG. 2, in this particular embodiment the "coarse" location phase 1 comprises the following steps:
- the terminal searches for and acquires (20) a satellite, for a predetermined elevation angle $\alpha$, by varying its azimuth angle $\theta$;
- the terminal receives (21) from the acquired satellite information relating to the position of the acquired satellite;
- the terminal calculates (22) from the information relating to the position of the acquired satellite an iso-elevation surface projected onto a predetermined model of the Earth and on which the terminal is located;
- the terminal reiterates the above steps 20 through 22 to perform N iterations in total with N≧3. The terminal therefore calculates N iso-elevation surfaces on which it is located. The N satellites acquired during the N iterations of the above steps 20 through 22 have azimuth angles $\theta$ as seen by the terminal separated by at least 30°, for example. Of the N satellites acquired during the successive iterations, at least one has an azimuth angle $\theta$ as seen by the terminal at least 10° from the azimuth angles of the other two satellites;
- the terminal determines (23) a "coarse" estimated position by calculating the intersection of the N iso-elevation surfaces.

Figure 4:
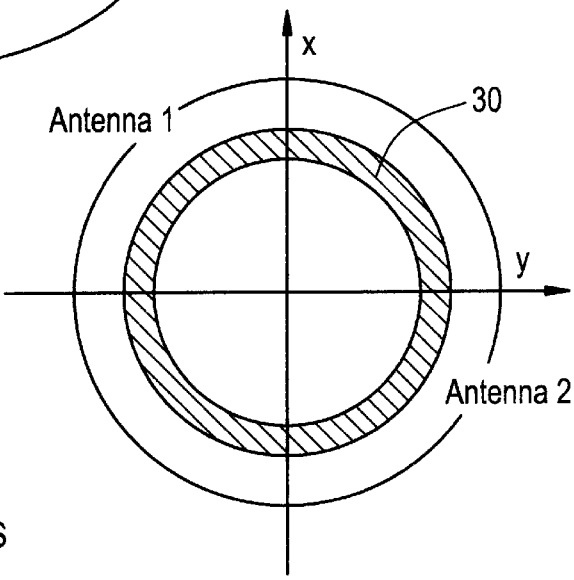

During step 20 the terminal searches for a satellite in a ring in which the satellite may be found, knowing that the satellite is at a predetermined distance from the Earth (for example 1 500 km). FIGS. 3 and 4 are respectively a perspective view and a plan view of a ring 30 of this kind used by the terminal T to search for a satellite S having a given elevation $\alpha$. During this search and acquisition phase 20 the two directional antennas of the terminal turn at the same elevation angle, each covering approximately 180° about the azimuth angle $\theta$.

Figure 5:
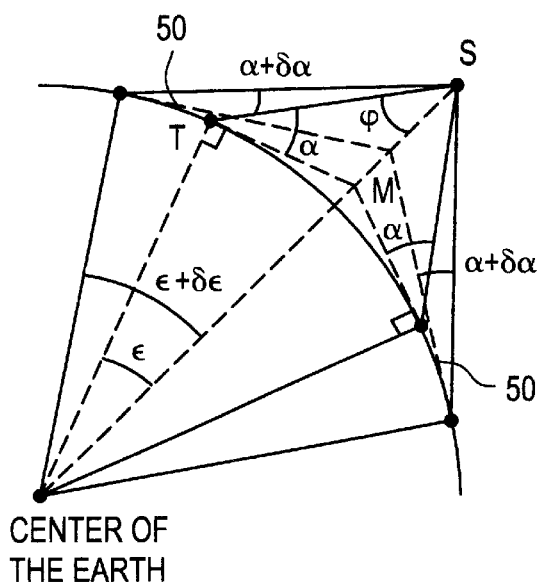
FIGS. 5 and 6 are respectively a side view and a view as seen from the satellite of an iso-elevation surface used to explain one of the steps of the FIG. 2 flowchart.
Figure 6:
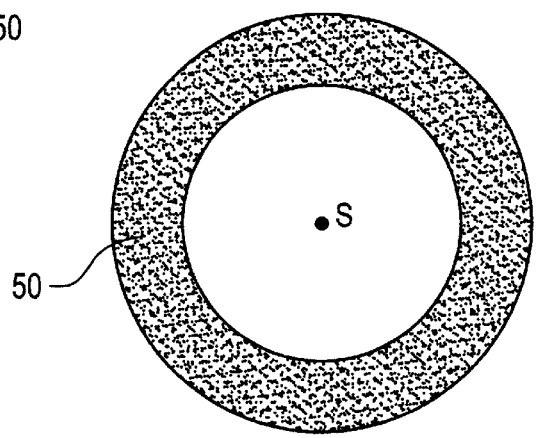

FIGS. 5 and 6 are respectively a side view and a top view (as seen from the satellite S) of an iso-elevation surface calculated by the terminal T during step 22. Considering a projection onto a perfect spherical Earth model, and because of the uncertainty $\delta\alpha$ as to the elevation angle $\alpha$, the iso-elevation surface is a ring 50. Clearly other, more complex Earth models can equally be considered without departing from the scope of the present invention.

At the end of this "coarse" location phase 1 the terminal has a "coarse" estimated position 24, for example accurate to within 200 km (i.e. to within ±100 km). Also, the terminal can correct the bias in azimuth, for example to within ±2°, using the "coarse" location of the terminal and the N satellites acquired successively, together with a time correction of a few milliseconds which makes it possible to retain a time reference less than one second throughout the subsequent "intermediate" and "fine" location phases.

One particular embodiment of the "intermediate" location phase 2 will now be described with reference to FIGS. 7 and 8.

Figure 7:
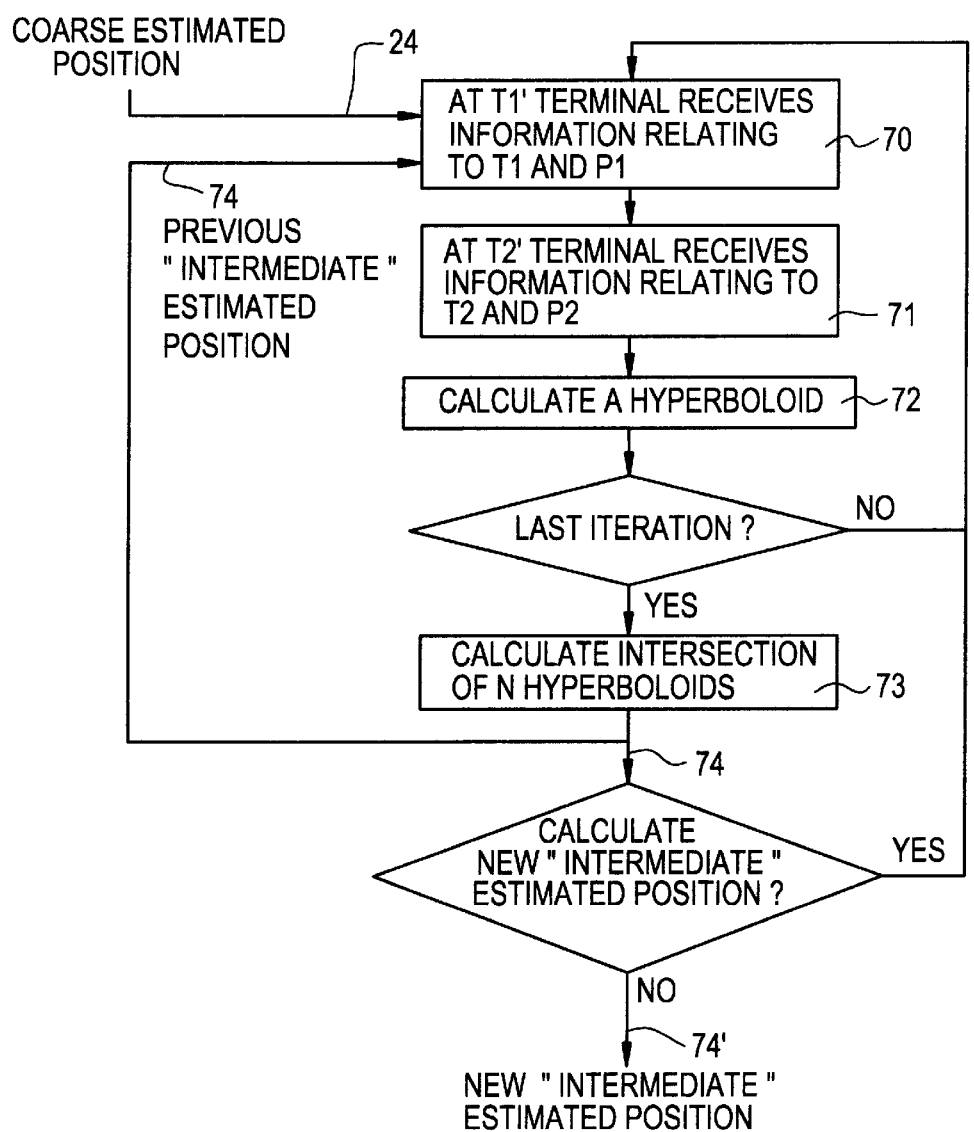
FIG. 7 is a simplified flowchart of one particular embodiment of the "intermediate" location phase shown in the FIG. 1 flowchart.

As shown in the simplified flowchart of FIG. 7, in this particular embodiment the "intermediate" location phase 1 comprises the following steps:
- at a first time t1', the terminal receives (70) from a first active satellite ("satellite 1") first information relating to the time t1 of transmission of the first information by the first active satellite and the position p1 of the first active satellite at time t1;
- at a second time t2' the same as or close to the first time t1', the terminal receives (71) from a second active satellite ("satellite 2") second information relating to the time t2 of transmission of the second information by the second active satellite and the position p2 of the second active satellite at time t2;
- the terminal calculates (72) a first hyperboloid $H_{1,2}$ on which the terminal is located (see below for detailed explanation);
- the terminal reiterates steps 70 through 72 to effect N iterations in total, with N≧3. The terminal therefore calculates N hyperboloids on which it is located;
- and the terminal determines (73) an "intermediate" estimated position 74 by calculating the intersection of the N hyperboloids knowing the "coarse" estimated position 24.

Using the (previous) "intermediate" estimated position 74 instead of the "coarse" estimated position 24, the terminal can reiterate M times the N iterations of the above steps 70 through 72 and the above step 73 so as to obtain M times a new "intermediate" estimated position 74'.

These M new "intermediate" estimated positions can be calculated successively, either from the previous iteration's intermediate estimated position or all from the same (previous "coarse" or "intermediate") estimated position.

In the second case the step 73 of determining the "intermediate" estimated position 74 can be optimized. This is done by searching for the point P from a predetermined set of points that minimizes the error in the "intermediate" estimated position of the terminal when the error is accumulated over the M "intermediate" estimated positions or calculated from the same previous "coarse" or "intermediate" estimated position. The predetermined set of points is a disk, for example, with the center at the "coarse" estimated position (for the first calculation of an "intermediate" estimated position) or the previous "intermediate" estimated position (for each calculation of a new "intermediate" estimated position), and the radius of which is the uncertainty in the (previous "coarse" or "intermediate") estimated position which is the center of the disk.

Each hyperboloid $H_{ij}$ calculated by the terminal in step 72 is such that:

$$H_{i,j}: dj-di=(tj'-tj).c-(ti'-ti).c,$$

where:
- di is the distance between the terminal and the position pi of the ith active satellite at time ti,
- dj is the distance between the terminal and the position pj of the jth active satellite at time tj,
- ti and tj are the ith and jth times of transmission by the ith and jth satellites, respectively,
- ti' and tj' are ith and jth times of reception by the terminal, and
- c is the speed of light.

The equation defining each hyperboloid $H_{i,j}$ can also be written:

$$H_{i,j}: dj-di=(tj'-ti).c-(tj-ti).c=\Delta t'.c-\Delta t.c$$

The terminal can calculate $\Delta t'$ and $\Delta t$ because it receives ti and tj. It measures ti' and tj' itself. Consequently, knowing the positions pi and pj of the ith and jth satellites at times ti and tj, respectively, the terminal can calculate the hyperboloid $H_{i,j}$.

A hyperboloid $H_{i,j}$ is calculated using either two active satellites simultaneously active at a given time or two active satellites (respectively outgoing and incoming) simultaneously active only during hand-off between satellites.

Each of the two directional antennas of the terminal is pointed at a separate satellite. As already explained hereinabove, it is clear that the terminal can receive simultaneously from more than two active satellites, in which case a plurality of hyperboloids can be calculated from the information received. Each pair of satellites is used to calculate one hyperboloid.

Figure 8:
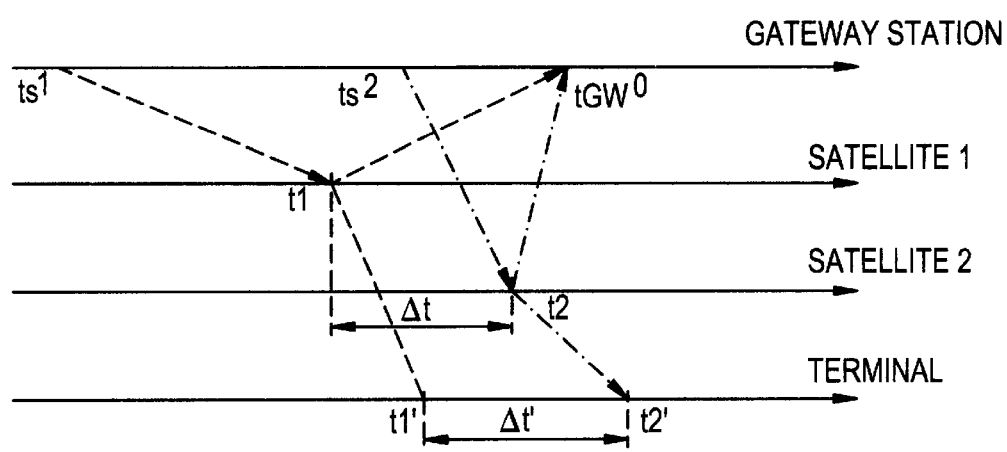
FIG. 8 is a timing diagram showing certain steps of the FIG. 7 flowchart.

FIG. 8 shows the times t1, t2, t1' and t2' with the respective elements concerned (namely the first satellite for t1, the second satellite for t2 and the terminal for t1' and t2'), together with the time intervals $\Delta t$ and $\Delta t'$. FIG. 8 also shows that the gateway station transmits at times $t_s^1$ and $t_s^2$ the first and second information that the first and second satellites transmit at times t1 and t2. Note that in the example given the gateway station transmits (at times $t_s^1$ and $t_s^2$) with temporal pre-compensation so that the first and second information transmitted (at times $t_s^1$ and $t_s^2$) by the first and second satellites is received substantially simultaneously (at time $t_{GW}^0$) by the gateway station.

At the end of this "intermediate" location phase 1 the terminal has an "intermediate" estimated position 74 or 74', for example accurate to within ±350 m.

First and second particular embodiments of the "fine" location phase 3 will now be described with reference to FIGS. 9, 10 and 11.

In the first particular embodiment the "fine" location phase 3 comprises the following steps:
- the gateway station (associated with the cell in which the terminal is located) sends (90) the terminal a predetermined message via an active satellite. As shown in FIG. 10 the gateway station transmits at time $t_{GW}^0$ and the satellite transmits at time $t_s^0$;
- the terminal receives the predetermined message at time $t_T^0$ and, knowing its "intermediate" estimated position and the real time position of the active satellite, generates and then transmits (91) to the gateway station via the active satellite a response message indicating in particular the time period $\Delta'_T$ between the time $t_T^0$ of reception of the predetermined message and the time $t_T$ of transmission of the response message. As shown in FIG. 10, the satellite transmits at time $t_s$ the response message transmitted by the terminal at time $t_T$;
- at time "measured $t_{GW}$" the gateway station receives a response message and calculates (92) from it information relating to the timing advance $\Delta t_{TA}$ of the response message from the terminal. The gateway station calculates the difference $\Delta t_{TA}$ between the "measured $t_{GW}$" reception time and the "expected $t_{GW}$" reception time. There is a nil timing advance: $\Delta t_{TA}=0$ only if the estimated position used is exactly the same as the actual position of the terminal;
- the gateway station transmits (93) to the terminal via the active satellite the information relating to the timing advance $\Delta t_{TA}$;
- from the information relating to the timing advance $\Delta t_{TA}$ and the "intermediate" estimated position, the terminal calculates (94) its "fine" estimated position 95;
- using the previous "fine" estimated position 95 in place of the "intermediate" estimated position 74 or 74', the terminal reiterates steps 90 through 92 M times to obtain a new "fine" estimated position 95'. Each of these M iterations is done with a separate satellite, for example. Note that if it is done with the same satellite it is preferable for the satellite to have azimuth angles θ and/or elevation angles α as seen from the terminal separated by at least 10° for two successive iterations.

The M new "fine" estimated positions can be calculated successively, either from the preceding iteration's "fine" estimated position or from the same (previous "intermediate" or "fine") estimated position.

In the second case step 94 determining the "fine" estimated position 95 can be optimized. This is done by searching for the point P from a predetermined set of points that minimizes the error in the "fine" estimated position of the terminal when the error is accumulated over the M "fine" estimated positions or calculated from the same previous "intermediate" or "fine" estimated position. The predetermined set of points is, for example, a disk the center of which is at the "intermediate" estimated position (for the first calculation of a "fine" estimated position) or the previous "fine" estimated position (for each calculation of a new "fine" estimated position) and the radius of which is the uncertainty in the (previous "intermediate" or "fine" estimated position) which is the same as the center of the disk.

The second embodiment of the "fine" location phase 3 shown in FIG. 11 flowchart differs from the first embodiment in that it is the gateway station, not the terminal, which terminates the "fine" estimated position of the terminal.

Figure 9:
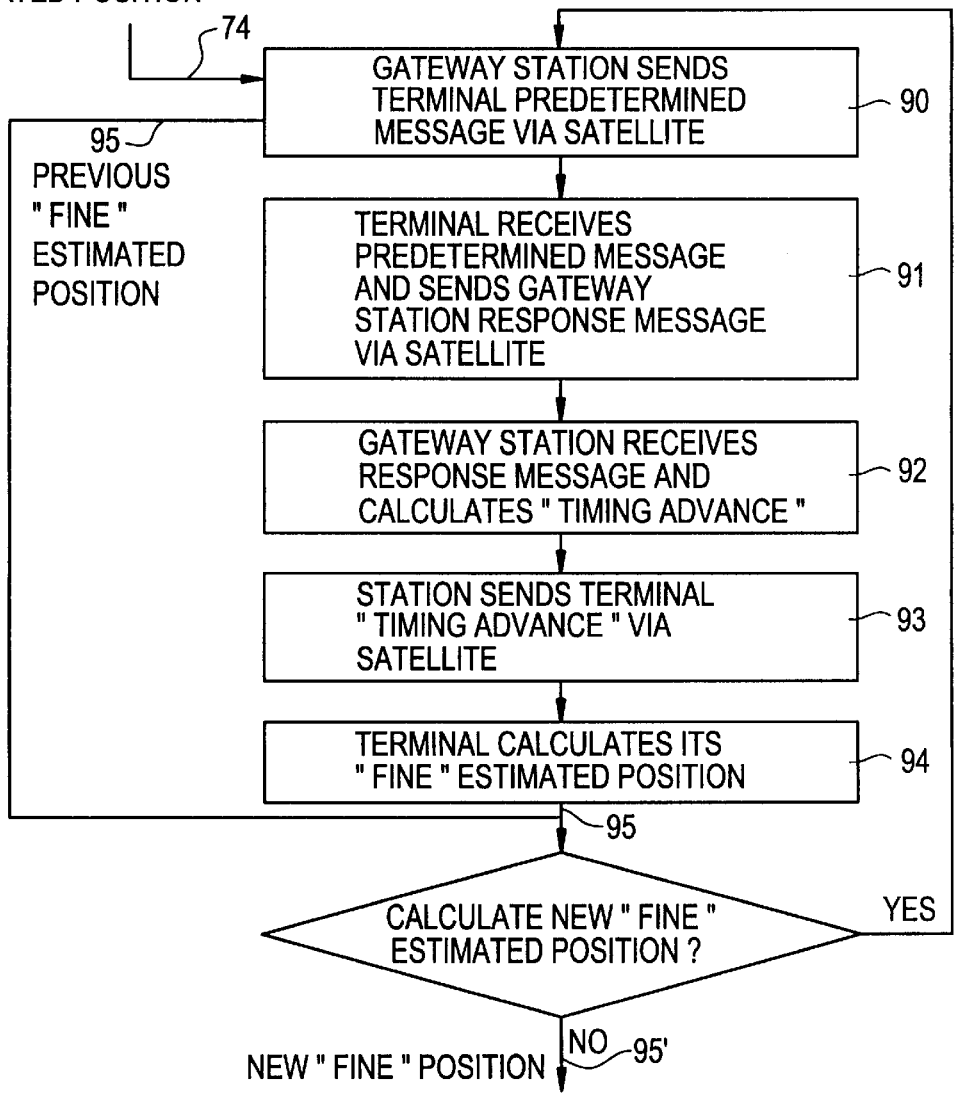
FIG. 9 is a simplified flowchart of a first particular embodiment of the "fine" location phase shown in the FIG. 1 flowchart.
Figure 10:
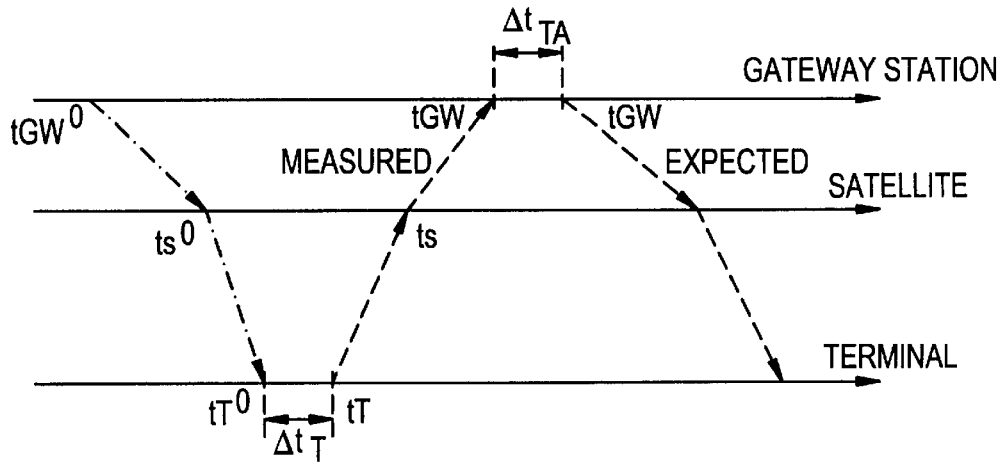
FIG. 10 is a time diagram illustrating certain steps of the FIG. 9 flowchart.

In the second embodiment the "fine" location phase includes, in addition to steps 90 to 93 in FIG. 9 and already explained hereinabove, the following previous and final steps:
- the terminal transmits (110) to the gateway station via the active satellite information relating to its "fine" estimated position; and
- the gateway station transmits (112) to the terminal via the active satellite the "intermediate" estimated position of the terminal;

Also, step 94 in FIG. 9 is replaced by the following step 111:
- from the information relating to the timing and the "intermediate" estimated position, the gateway station calculates (111) the "fine" estimated position of the terminal.

It is clear that many other embodiments of the invention can be considered. In particular other "coarse" and "fine" location phases can be provided compatible with the "intermediate" location phase described hereinabove.

What is claimed is:

1. A method of locating a fixed terminal of a satellite telecommunication system comprising a constellation of satellites, a plurality of gateway stations each associated with a separate geographical cell and connected to a terrestrial telecommunication network, and a plurality of fixed terminals, one or more satellites being active relative to a given gateway station only if they are visible therefrom, each active satellite which receives information from the gateway station relative to which it is active transmits it to the fixed terminal or terminals in its coverage area, each active satellite that receives information from a fixed terminal in its coverage area transmitting the information to the gateway station relative to which it is active, which method comprises an "intermediate" location phase comprising the following steps:

-i- at a first time t1', said terminal receives from a first active satellite first information relating to the time t1 of transmission of said first information by said first active satellite and the position p1 of said first active satellite at said time t1;

-ii- at a second time t2' the same as or close to said first time t1', said terminal receives from a second active satellite second information relating to the time t2 of transmission of said second information by said second active satellite and the position p2 of said second active satellite at said time t2;

-iii- said terminal calculates a first hyperboloid $H_{1,2}$ on which said terminal is located and such that:

$$H_{1,2}: d2-d1=(t2'-t2).c-(t1'-t1).c$$

where:

d1 is the distance between the terminal and said position p1 of the first active satellite at time t1, d2 is the distance between the terminal and said position p2 of the second active satellite at time t2, t1 and t2 are the first and second times of transmission by said first and second satellites, respectively, t1' and t2' are said first and second times of reception by the terminal, and c is the speed of light;

-iv- said terminal reiterates steps -i- through -iii- at least twice to calculate at least second and third hyperboloids on which said terminal is located; and -v- said terminal determines an "intermediate" estimated position by calculating the intersection of said first and at least second and third hyperboloids assuming a "coarse" estimated position of said terminal to be known.

2. The method claimed in claim 1 wherein, in said step -iv-, each new iteration of steps -i- through -iii- is effected with a pair of satellites belonging to the group comprising:

a pair of satellites separate from said first and second satellites; and a pair of satellites one of which is one of said first and second satellites and the other of which is separate from said first and second satellites.

3. The method claimed in claim 1 wherein said "intermediate" location phase further includes the following step:

-vi- using the previous "intermediate" estimated position instead of said "coarse" estimated position, said terminal reiterates at least once steps -i- through -v- to obtain a new "intermediate" estimated position.

4. The method claimed in claim 1 wherein the gateway station relative to which said first and second satellites are active transmits said first and second information with temporal precompensation such that after transmission by said first and second satellites said first and second information is received substantially simultaneously by said gateway station.

5. The method claimed in claim 1 wherein the pair comprising said first and second active satellites belongs to the group comprising:

the pairs in which the two satellites are simultaneously active at any time; and the pairs in which the two satellites, respectively outgoing and incoming, are simultaneously active exclusively during hand-off between satellites, enabling a gateway station to replace said outgoing active satellite, which is ceasing to be visible, by said incoming active satellite, which is becoming visible.

6. The method claimed in claim 1 wherein each terminal has means for simultaneously receiving information transmitted by at least two different satellites.

7. The method claimed in claim 6 wherein said means for simultaneously receiving information transmitted by at least two separate satellites comprise at least two directional antennas each pointed at a separate satellite.

8. The method claimed in claim 1 wherein said "intermediate" location phase is preceded by a "coarse" location phase comprising the following steps:

-a- said terminal searches for and acquires a satellite for a predetermined elevation angle α by varying its azimuth angle θ;

-b- said terminal receives from said acquired satellite information relating to the position of said acquired satellite;

-c- said terminal calculates from said information relating to the position of the acquired satellite an iso-elevation surface projected onto a predetermined Earth model and on which said terminal is located;

-d- said terminal reiterates steps -a- through -c- at least twice so as to calculate at least two other iso-elevation surfaces on which said terminal is located; and -e- said terminal determines a "coarse" estimated position by calculating the intersection of said at least three iso-elevation surfaces.

9. The method claimed in claim 8 wherein of said at least three satellites acquired during successive iteration of steps -a- through -c- at least one has an azimuth angle θ as seen from said terminal separated by at least 10° from the azimuth angles of the other two satellites.

10. The method claimed in claim 8 wherein, in said step -a-, said two directional antennas turn with the same elevation angle, each covering approximately 180° about the azimuth angle θ.

11. The method claimed in claim 1 wherein said "intermediate" location phase is followed by a "fine" location phase comprising the following steps:

-1- the gateway station associated with the cell in which said terminal is located sends said terminal a predetermined message via a satellite active relative to said gateway station;

-2- said terminal receives said predetermined message and, knowing its "intermediate" estimated position and the real time position of the satellites of said constellation, generates and then transmits to said gateway station via said active satellite a response message indicating in particular the time period between reception of said predetermined message and transmission of said response message;

-3- from said response message, said gateway station calculates information relating to the timing advance of said terminal;

-4- said gateway station transmits to said terminal via said active satellite said information relating to the timing advance; and -5- from said information relating to the timing advance and from said "intermediate" estimated position said terminal calculates its "fine" estimated position.

12. The method claimed in claim 11 wherein said "fine" location step further includes the following preliminary and final steps:

-0- said terminal transmits information relating to the "intermediate" estimated position to said gateway station via said active satellite; and -6- said gateway station transmits said "fine" estimated position of the terminal to said terminal via said active satellite;

and said step -5- is replaced by the following step:

-5- from said information relating to the timing advance and said "intermediate" estimated position, said gateway station calculates the "fine" estimated position of the terminal.

13. The method claimed in claim 11 wherein said "fine" location phase further includes the following step:

-7- using the previous "fine" estimated position in place of said "intermediate" estimated position, said terminal reiterates at least once steps -1- for through -5- or -0- through -6- to obtain a new "fine" estimated position.

14. The method claimed in claim 13 wherein, in step 7, each new iteration of steps -1- through -5- or -0- through -6- is effected with the same satellite but with azimuth angles $\theta$ and/or elevation angles $\alpha$ as seen from said terminal separated by at least 10°.

15. The method claimed in claim 13 wherein each new iteration of steps -1- through -5- or -0- through -6- for in step 7 is effected with a different satellite.

* * * * *